(12) United States Patent
Herwig et al.

(10) Patent No.: US 7,818,146 B2
(45) Date of Patent: Oct. 19, 2010

(54) METHOD AND DEVICE FOR THE DIAGNOSIS OF TECHNICAL DEVICES DISPOSED WITHIN AN INDUSTRIAL INSTALLATION

(75) Inventors: Jörg Herwig, Kandern (DE); Dieter Keese, Wahlsburg (DE); Harry Plotzki, Göttingen (DE); Frank Buhl, Rosdorf (DE); Rolf Merte, Wiesloch (DE); Peter Riegler, Göttingen (DE); Karl-Heinz Rackebrandt, Adelebsen (DE); Andreas Thöne, Nörten-Hardenberg (DE)

(73) Assignee: ABB AG, Mannheim (DE)

( * ) Notice: Subject to any disclaimer, the term of this patent is extended or adjusted under 35 U.S.C. 154(b) by 78 days.

(21) Appl. No.: 11/663,968

(22) PCT Filed: Sep. 28, 2005

(86) PCT No.: PCT/EP2005/010467

§ 371 (c)(1),
(2), (4) Date: Mar. 28, 2007

(87) PCT Pub. No.: WO2006/034852

PCT Pub. Date: Apr. 6, 2006

(65) Prior Publication Data

US 2008/0167745 A1 Jul. 10, 2008

(30) Foreign Application Priority Data

Sep. 29, 2004 (DE) ................ 10 2004 047 241

(51) Int. Cl.
*G06F 11/30* (2006.01)
(52) U.S. Cl. ................................ 702/184
(58) Field of Classification Search .......... 702/34, 702/42, 47, 56–59, 90, 91, 104, 183–185, 702/188, 189; 73/865.9; 137/15.01
See application file for complete search history.

(56) References Cited

U.S. PATENT DOCUMENTS 5,287,875 A * 2/1994 Otani .................. 137/15.01

(Continued)

FOREIGN PATENT DOCUMENTS

JP 08261886 A 10/1996

(Continued)

OTHER PUBLICATIONS

International Search Report dated Feb. 10, 2006.

(Continued)

*Primary Examiner*—Mohamed Charioui
(74) *Attorney, Agent, or Firm*—Buchanan Ingersoll & Rooney PC

(57) ABSTRACT

Disclosed is a method for diagnosing technical devices, especially pumps and valves, which are arranged within an installation used in the processing industry. According to said method, disturbance variables that affect the devices and influence the service life thereof are detected by means of sensory technology while the data of said disturbance variables is processed in a simulative manner in order to determine the expected service life of each device. Various maintenance instructions which are output along with the expected remaining trouble-free operating time of the industrial installation when a lower service life threshold value of one or several devices has been reached are stored in an expert unit.

13 Claims, 1 Drawing Sheet

U.S. PATENT DOCUMENTS

| | | | |
|---|---|---|---|
| 5,533,413 A * | 7/1996 | Kobayashi et al. | 73/865.9 |
| 6,567,718 B1 | 5/2003 | Campbell et al. | |
| 6,584,430 B1 * | 6/2003 | Rosenbaum et al. | 702/183 |
| 6,691,065 B2 * | 2/2004 | Hayashi et al. | 702/184 |
| 2002/0143421 A1 | 10/2002 | Wetzer | |
| 2002/0174384 A1 | 11/2002 | Graichen et al. | |
| 2004/0162651 A1 | 8/2004 | Halm et al. | |
| 2006/0025967 A1 * | 2/2006 | Furno et al. | 702/184 |

FOREIGN PATENT DOCUMENTS

| | | |
|---|---|---|
| JP | 3242529 B2 | 10/2001 |
| WO | 01/63436 A1 | 8/2001 |
| WO | 02/097682 A1 | 12/2002 |
| WO | 2004/078543 A2 | 9/2004 |

OTHER PUBLICATIONS

PCT/ISA/237.

* cited by examiner

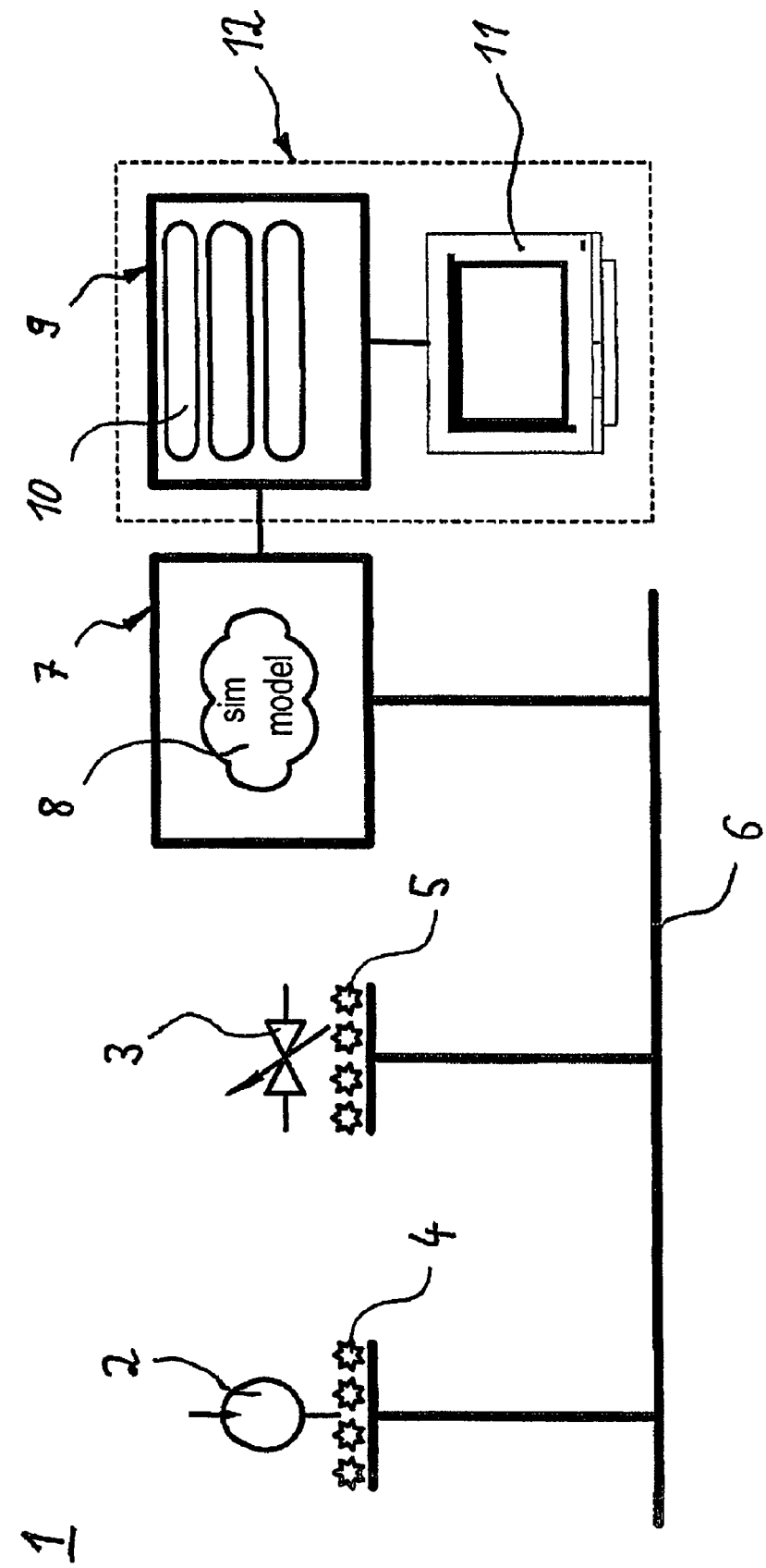

METHOD AND DEVICE FOR THE DIAGNOSIS OF TECHNICAL DEVICES DISPOSED WITHIN AN INDUSTRIAL INSTALLATION

BACKGROUND OF THE INVENTION (1) Field of Invention

This invention refers to a method and a device for diagnosing technical devices, especially pumps and valves, that are disposed within an industrial installation used in the processing industry, with disturbance variables that affect the devices and influence the service life thereof being detected by means of sensory technology with the data of said disturbance variables being processed in a simulative manner in order to determine the expected service life of each device.

(2) Description of Related Art

The area of application of this invention extends to industrial installations, such as technical process installations, mechanical production installations and similar. Within these installations, individual technical devices are linked to form a system to produce a product, mainly by fully automatic means. For the automatic production of products within those industrial installations that are of interest here, the individual technical devices are usually also automatically monitored with respect to their wear state. The wear state of a device within the industrial installation is diagnosed to enable devices that require maintenance or repair to be identified in order for an appropriate, time-saving maintenance or repair of the industrial installation be carried out without a high manual diagnostic expense.

In the general prior art, generic technical devices are known which include electronic diagnosis means that form a sort of maintenance activator. Technical devices of this kind can use sensory technology to detect events that trigger maintenance or repair and output a message immediately a maintenance case occurs. Such a maintenance case can, for example, be triggered by a defective pipe within the technical device, the defect of which has been determined by sensory technology. A disadvantage of this type of diagnosis is that the message regarding a required maintenance case does not take place until a fault or functional limitation of the technical device has already occurred. Because of this reactive diagnosis, the occurrence of a maintenance case is often unpredicted and sudden, which in extreme cases leads to a correspondingly sudden failure of the complete industrial installation. This in turn can lead to unforeseen production failures.

U.S. Pat. No. 5,533,413 discloses a method and a device for diagnosis of technical devices disposed within an industrial installation that avoids the aforementioned disadvantages in that a type of service life clock is assigned by simulatory means to each technical device. The disturbance variables such as temperature rise, pressure increases and vibration stresses that affect the technical devices and influence the service life thereof are detected by sensory means. The data obtained in this way are then processed by technical simulatory means to determine the expected service life of the device. For simulation, a simulation model of the associated technical device on which the disturbance variables influencing the service life act as input data is created and parameterized. The main result of the simulation is that it enables the expected service life of the technical device to be calculated. This reduces if the disturbance variables influencing the service life occur frequently over a long duration and at high intensity, whereas in the reverse case the expected service life increases if the disturbance variables influencing the service life occur seldom, over a short time interval and with less intensity.

Although this technical solution provides a very reliable prognosis with regard to the expected service life of the individual technical device, the type of damage to be expected that the disturbance triggers, for example a defect in a pipe in the technical device due to leakage or blockage, is completely unspecified. Therefore, the operator of the industrial installation receives only information regarding when and on what technical device a disturbance is to be expected. Information on the type of disturbance to be expected and the correct maintenance measures for rectifying this disturbance are, however, absent. Therefore, despite timely prognosis of a fault in a technical device of an industrial installation, long shutdown times can still occur because the required maintenance and repair measures may be unpredictably expensive or it may not be possible to obtain the correct replacement parts in good time.

SUMMARY

It is therefore the object of the present invention to further improve a method and a device for the diagnosis of technical devices that are disposed within an industrial installation to a point where both the type and extent of the next maintenance or repair can be predicted.

The invention is based on the principle of process technology that includes an expert unit in which various maintenance instructions can be stored, with said maintenance instructions being output together with the expected remaining trouble-free operating time of the industrial installation when a lower service life limit of one or more devices is reached.

The advantage of the solution according to the invention is especially that a service life clock for a technical device, implemented in a technical simulatory manner, is linked to appropriate maintenance instructions that are suitable for rectifying the predicted fault case just before the service life clock time has elapsed. To do so, the maintenance instructions are not output until a lower service life limit is reached that is user definable and that should be set so that there is still sufficient time to implement the output maintenance instruction in good time before the actual fault case occurs.

The maintenance instruction that is the object of the invention can contain, as information, a complete replacement of at least one of the devices. It is also conceivable that the maintenance instruction indicates the need to replace a part within a device that is causing the predicted maintenance. A part of this kind requiring maintenance can be simply identified in this case by means of the sensors, already present in any case, for determining the disturbance variables that influence the service life. For example, a reduction in pressure downstream of a pipe integrated into a technical device that is detected by a pressure sensor can indicate a progressive blockage of the pipe. Consequently, the maintenance instruction does not output a replacement of the complete technical device but only replacement of the part of the technical device specifically identified by this sensor, i.e. the pipe.

According to a further measure to improve the invention, the expert unit, after maintenance consisting of the replacement of devices and/or replacement of parts of devices, determines the new remaining trouble-free operating time of the industrial installation, in order to give expression to the success of the maintenance by its achievement of a relatively higher remaining trouble-free operating time. The indication of an increased remaining trouble-free operating time after the maintenance thus enables the operator of the industrial installation to determine that the completed maintenance or repair had the desired effect. Accordingly, a reset, so to speak, of the service life clock takes place.

The device according to the invention for diagnosis of technical devices disposed within an industrial installation should preferably be implemented in the industrial installation in such a way that at least the expert unit and the display unit connected to it for output of the maintenance instructions and expected remaining trouble-free operating time are centrally arranged in its control point. The expert unit with the associated display unit can, for example, be embodied in the form of a personal computer with suitable software. Advantageously, the communication between individual decentralized technical devices of the industrial installation and the central control point, in which at least the expert unit with a display unit is arranged, takes place via a databus system. Field bus systems, as they are called, that support the necessary bidirectional communication at device level with appropriate suitable protocols, are particularly suitable for this purpose. The simulation unit, to the input of which the sensors for detecting disturbance variables that affect the devices and influence the service life thereof are connected, can either be positioned at the technical devices themselves or in the central control point of the industrial installation. It is also conceivable for the simulation unit and expert unit to be embodied in the same personal computer in the form of suitable software.

Further measures to improve the invention are shown in more detail in the following, together with the description of a preferred exemplary embodiment of the invention.

BRIEF DESCRIPTION OF THE DRAWING

FIG. 1 shows a schematic block diagram of a device for diagnosis of technical devices.

DETAILED DESCRIPTION

The FIGURE shows, as an example, technical devices 2 and 3 in the form of a technical process installation within an industrial installation 1 for producing an intermediate chemical product. Technical device 2 is a pump for delivering a fluid medium and technical device 3 is a valve, connected so as to open or close, within a pipe (not illustrated in more detail) for transporting the fluid medium. Both devices 2 and 3 are each provided with associated sensors 4 or 5 respectively for detection of the disturbance variables that affect the devices 2 and 3 and influence the service life thereof, such as pipe pressure, operating temperature and similar. Sensors 4 and 5 detect the disturbance variables that influence the service life and pass these via a databus system 6, designed as a type of field bus, to a simulation unit 7. A device model 8 that represents technical devices 2 and 3 and the operating parameters thereof as a model is stored in the simulation unit 7. The device model 8 is supplied with the disturbance variables influencing the service life, determined by sensory technology, from which the simulation unit 7 predicts by technical simulatory means the expected service life of each device. The simulation unit 7 is connected to an expert unit 9 in which various maintenance instructions 10 are stored by means of suitable storage elements. When a service life limit of one or more devices 2 and/or 3, that is also stored, is reached, the expert unit 9 uses an integrated evaluation algorithm to determine an associated maintenance instruction that is then output, together with the expected remaining trouble-free operating time of the industrial installation 1, via a downstream display unit 11.

In this way, it is possible to provide the appropriate maintenance instruction, that is to be implemented for rectification of the fault case before its occurrence, to the operator of the industrial installation 1 in good time before the occurrence of the predicted fault case. This can be the maintenance instruction for a complete replacement of at least one of devices 2 or 3 or for replacement of parts that require maintenance within device 2 or 3.

For this purpose, the maintenance instruction also contains a designation of the device 2 or 3 to be replaced and/or of the parts thereof requiring maintenance. The expert unit 9 then determines the new remaining trouble-free operating time of the industrial installation 1. This new remaining time is now higher than the previously predicted remaining time up to the occurrence of a fault case because the maintenance or repair on the critical device 2 or 3 has been carried out. The success of the maintenance or repair can be assessed by the comparatively higher remaining trouble-free operating time, i.e. the time until the next predicted fault case. If, for example, the replacement of a part for device 2 or 3 does not bring about the expected higher service life, the particular device 2 or 3 can be completely replaced immediately or at a given time.

In this exemplary embodiment, the expert unit 9 and the associated display unit 11 are centrally mounted in a control point 12 of the industrial installation 1, i.e. distant from the decentralized technical devices 2 and 3 with the associated sensors 4 or 5 respectively.

CHARACTER REFERENCE LIST

1 Industrial installation
2 First technical device
3 Second technical device
4 First sensor
5 Second sensor
6 Databus system
7 Simulation unit
8 Device model
9 Expert unit
10 Maintenance instruction
11 Display unit
12 Control point

The invention claimed is:

1. A device for diagnosis of a plurality of processing devices that are disposed within an industrial installation used in a processing industry with sensors for detecting disturbance variables that affect the plurality of processing devices and influence the service life thereof, with data of said disturbance variables being processed by a simulation unit containing a stored device model in order to determine the expected service life of each said processing device, comprising an expert unit containing stored servicing instructions that outputs an associated maintenance instruction for at least two processing devices together with the expected remaining trouble-free operating time of the industrial installation via a central display unit when a lower service life limit of one of said processing devices is reached; and wherein the maintenance instructions contain a complete replacement of at least two of the processing devices and a replacement of parts of a processing devices requiring maintenance, with the processing device or part thereof to be replaced being given within the maintenance instruction.

2. The device for diagnosis as claimed in claim 1, wherein the expert unit and the display unit are connected to be centrally arranged in a control point of the industrial installation.

3. The device for diagnosis, as claimed in claim 2, including a databus system for communication between individual decentralized processing devices of the industrial installation and the central control point with at least the expert unit and the display unit.

4. The device for diagnosis as claimed in claim 2, wherein the expert unit, after maintenance including the replacement of said processing devices and/or replacement of parts of said processing devices, determines a new remaining trouble-free operating time of the industrial installation, in order to give expression to the success of the maintenance by its achievement of a higher remaining trouble-free operating time.

5. The device for diagnosis as claimed in claim 1, wherein the expert unit, after maintenance including the replacement of said processing devices and/or replacement of parts of said processing devices, determines a new remaining trouble-free operating time of the industrial installation, in order to give expression to the success of the maintenance by its achievement of a higher remaining trouble-free operating time.

6. The device for diagnosis, as claimed in claim 5, including a databus system for communication between the individual decentralized processing devices of the industrial installation and the central control point with at least the expert unit and the display unit.

7. The device for diagnosis, as claimed in claim 1, including a databus system for communication between individual decentralized processing devices of the industrial installation and the central control point with at least the expert unit and the display unit.

8. The device for diagnosis of claim 1, wherein the processing devices are at least one of pumps and valves.

9. The device for diagnosis of claim 1, wherein the sensors detect disturbance variables that influence service life, said disturbance variables being processed in a simulative manner in order to determined the expected service life of at least one part of the processing device.

10. A method for diagnosing a plurality of processing devices that are disposed within an industrial installation used in a processing industry, with disturbance variables that affect the plurality of processing devices and influence the service life thereof being detected by sensors, with data of said disturbance variables being processed in a simulative manner in order to determine the expected service life of each said processing device, said method comprising:
    monitoring a service life limit for each of the plurality of processing devices, said service life limit being reached before the processing devices fail;
    storing various maintenance instructions in an expert unit, and outputting maintenance instructions for at least two processing devices together with an expected remaining trouble-free operating time of the industrial installation when a lower service life limit of one of said processing devices is reached; and
    wherein the maintenance instructions contain, as information, a complete replacement of at least two of the processing devices and a replacement of parts of a processing device requiring maintenance, with the processing devices or parts thereof to be replaced being given within the maintenance instruction.

11. The method of diagnosis as claimed in claim 10, comprising:
    the expert unit, after maintenance including the replacement of processing devices and/or replacement of parts of processing devices, determining a new remaining trouble-free operating time of the industrial installation, in order to give expression to the success of the maintenance by its achievement of a higher remaining trouble-free operating time.

12. The method of diagnosis of claim 10, wherein the processing devices are at least one of pumps and valves.

13. The method of diagnosis of claim 10, wherein the sensors detect disturbance variables that influence service life, said disturbance variables being processed in a simulative manner in order to determined the expected service life of at least one part of the processing device.

* * * * *